United States Patent
Hatch et al.

(10) Patent No.: US 8,988,238 B2
(45) Date of Patent: Mar. 24, 2015

(54) CHANGE DETECTION SYSTEM USING FREQUENCY ANALYSIS AND METHOD

(75) Inventors: Charles Terrance Hatch, Gardnerville, NV (US); Steven Ross Hadley, Sunol, CA (US)

(73) Assignee: General Electric Company, Schenectady, NY (US)

( * ) Notice: Subject to any disclaimer, the term of this patent is extended or adjusted under 35 U.S.C. 154(b) by 199 days.

(21) Appl. No.: 13/590,956

(22) Filed: Aug. 21, 2012

(65) Prior Publication Data

US 2014/0055274 A1    Feb. 27, 2014

(51) Int. Cl.
  G08B 21/00    (2006.01)
  G01H 1/00    (2006.01)
  G05B 19/4065    (2006.01)

(52) U.S. Cl.
  CPC .............. *G01H 1/00* (2013.01); *G05B 19/4065* (2013.01); *G05B 2219/37534* (2013.01); *G05B 2219/45103* (2013.01); *G05B 2219/49065* (2013.01)
  USPC ........... 340/679; 340/540; 340/683; 702/183; 702/56; 702/189

(58) Field of Classification Search
  CPC .... G08B 25/009; G08B 19/00; G08B 21/182; G08B 29/26; G08B 21/0236
  USPC .............. 340/679, 540, 683; 702/183, 56, 35, 702/189
  See application file for complete search history.

(56) References Cited

U.S. PATENT DOCUMENTS

| | | | |
|---|---|---|---|
| 6,182,022 B1 * | 1/2001 | Mayle et al. ................... | 702/182 |
| 7,183,905 B2 | 2/2007 | Neubauer et al. | |
| 7,317,994 B2 | 1/2008 | Iyer et al. | |
| 7,769,561 B2 | 8/2010 | Yuan et al. | |
| 7,826,943 B2 | 11/2010 | Yu et al. | |
| 7,930,122 B2 | 4/2011 | Yuan et al. | |
| 7,949,497 B2 | 5/2011 | Yuan et al. | |
| 7,970,556 B2 | 6/2011 | Hala et al. | |
| 8,112,381 B2 | 2/2012 | Yuan et al. | |

(Continued)

FOREIGN PATENT DOCUMENTS

DE    102010005525 A1    7/2011
EP    2213998 A2    8/2010

(Continued)

OTHER PUBLICATIONS

PCT Search Report and Written Opinion issued in connection with corresponding WO Patent Application No. PCT/US2013/054467 dated on Oct. 9, 2013.

*Primary Examiner* — Hoi Lau

(74) *Attorney, Agent, or Firm* — Fletcher Yoder P.C.

(57) ABSTRACT

Systems and methods are provided for monitoring operating machinery, acquiring data regarding characteristic behavior of the machinery being monitored, and processing of the data to determine and indicate when significant deviations from normal operating conditions are occurring that represent maintenance initiating or failure mode events. The method includes learning what normal operating conditions are for a machine of interest by acquiring data during observed normal operation, then calculating detection threshold values based on the acquired data. Finally, real-time monitoring of the machinery of interest during operation is employed, with alarms triggered upon occurrence of a previously-defined number of occurrences of behavior exceeding parameters associated with normal operation behavior.

19 Claims, 6 Drawing Sheets

(56) References Cited

U.S. PATENT DOCUMENTS

| | | |
|---|---|---|
| 8,162,788 B2 | 4/2012 | Hatch et al. |
| 8,174,402 B2 | 5/2012 | Bouse et al. |
| 2002/0139191 A1 | 10/2002 | Hedeen et al. |
| 2005/0197834 A1 | 9/2005 | Hatch |
| 2005/0231350 A1 | 10/2005 | Littrell et al. |
| 2006/0174164 A1 | 8/2006 | Hershey et al. |
| 2006/0178854 A1 | 8/2006 | Lindsay et al. |
| 2007/0038392 A1 | 2/2007 | Iyer et al. |
| 2007/0081583 A1 | 4/2007 | Petchenev et al. |
| 2008/0091630 A1 | 4/2008 | Bonissone et al. |
| 2008/0255775 A1* | 10/2008 | Beard et al. .................... 702/35 |
| 2009/0030752 A1 | 1/2009 | Senturk-Doganaksoy et al. |
| 2009/0043536 A1 | 2/2009 | Balderer et al. |
| 2009/0091443 A1 | 4/2009 | Chen et al. |
| 2010/0198534 A1* | 8/2010 | Hala et al. ...................... 702/56 |
| 2011/0049883 A1 | 3/2011 | Hatch et al. |
| 2011/0196820 A1 | 8/2011 | Yuan |
| 2011/0251804 A1 | 10/2011 | Hess et al. |
| 2012/0073364 A1 | 3/2012 | Hatch et al. |
| 2012/0330577 A1* | 12/2012 | Kar ................................ 702/56 |
| 2013/0063264 A1* | 3/2013 | Oktem et al. ................. 340/540 |

FOREIGN PATENT DOCUMENTS

| | | |
|---|---|---|
| JP | 20070064852 A | 3/2007 |
| WO | 2011088935 A1 | 7/2011 |

* cited by examiner

CHANGE DETECTION SYSTEM USING FREQUENCY ANALYSIS AND METHOD

BACKGROUND OF THE INVENTION

The present invention relates generally to systems and methods for monitoring machinery or other mechanical devices during operation, and more specifically, to systems and methods for monitoring machinery or other mechanical devices during operation, to detect possible operational issues including impending maintenance and failure situations.

Mechanical devices, particularly mechanical devices that incorporate rotating machinery, typically exhibit characteristic movements during operation, such as vibrations, that have frequencies and/or magnitudes that vary according to the operating speeds and conditions of the rotary machinery. An operating status of the vibration spectra of an operating machine is typically monitored, e.g., through the use of transducers, to confirm satisfactory steady state operation of the machine, and to identify when the machine may require maintenance or whether a failure event may be imminent. A machine, such as a wind turbine used for power generation, may have more than one hundred different vibrational characteristics, variations in which may indicate deviations from normal operational conditions, representing wear beyond accepted norms, or impending failure.

However, even identical machines can have distinctive characteristic "signatures" with respect to both steady state normal operation and failure modes. Frequently, little is known about the typical numerical values corresponding to characteristic movements associated with normal operating conditions for the machines. In such circumstances, challenges can arise when attempting to establish effective numerical values for machine operational parameters, for purposes of defining and subsequently detecting alarm events, such as when maintenance is required, or when a failure mode is occurring.

It would be desirable, when implementing monitoring systems for operating machinery, to set up monitoring and alarm systems that are sensitive and discriminating enough to identify and/or ignore random outlier events that would otherwise quantify, due to their deviation from normal operational values, as representing maintenance or failure mode operations. At the same time, it would be desirable, when implementing systems for operating machinery, to set up monitoring and alarm systems that are sufficiently reliable and robust to avoid excessive false alarm events.

When seeking to obtain the foregoing desired results, the challenge typically lies not with the physical equipment used to detect and monitor the operating machinery, but in appropriately processing and interpreting the data acquired as a result of the monitoring of the operating machinery. If the detected deviation from normal operation parameters required for an alarm event is set too low, the risk for false alarms is increased; if the detected deviation from normal operating parameters required for an alarm event is set too high, the risk of delayed or missed alarm, leading to potential damage to the machinery in question, is increased.

It would be desirable to provide a system and method for detection of changes in operating condition for a machine, while protecting against false or missed alarm events.

BRIEF DESCRIPTION OF THE INVENTION

In an aspect, a system for use in detecting a change in a mechanical system during operation thereof is provided. The system includes a processor; and a control system coupled to said processor. The control system is configured to determine at least one baseline value for a parameter associated with a physical characteristic of the mechanical system during normal operation over a predetermined time interval. The control system is further configured to calculate a first limit value associated with the physical characteristic of the mechanical system based on the at least one baseline value for the parameter. The control system is further configured to monitor the mechanical system and periodically calculate the parameter associated with the physical characteristic at predefined successive time intervals. The control system is further configured to compare the calculated parameter to the calculated first limit value during the predefined successive intervals to detect a change in the mechanical system during operation of the system.

In another aspect, a method for detecting a change in a mechanical system during operation thereof is provided. The method includes determining at least one baseline value for a parameter associated with a physical characteristic of the mechanical system during normal operation over a predetermined time interval. The method further includes calculating a first limit value associated with the physical characteristic of the mechanical system based on the at least one baseline value for the parameter. The method further includes monitoring the mechanical system and periodically calculating the parameter associated with the physical characteristic at predefined successive time intervals. The method further includes comparing the calculated parameter to the calculated first limit value during the predefined successive intervals to detect a change in the mechanical system during operation of the system.

DETAILED DESCRIPTION OF THE INVENTION

Although specific features of various exemplary embodiments of the invention may be shown in some drawings and not in others, this is for convenience only. In accordance with the principles of the invention, any feature of a drawing may be referenced and/or claimed in combination with any feature of any other drawing.

A technical effect of the systems and methods described herein includes at least one of: (a) determining at least one baseline value for a parameter associated with a physical characteristic of the mechanical system during normal operation over a predetermined time interval; (b) calculating a first limit value associated with the physical characteristic of the mechanical system based on the at least one baseline value for the parameter; (c) monitoring the mechanical system and periodically calculating the parameter associated with the physical characteristic at predefined successive time intervals; (d) comparing the calculated parameter to the calculated first limit value during the predefined successive intervals to detect a change in the mechanical system during operation of the system; (e) measuring values for the parameter associated with the physical characteristic during an initial operating period; (f) recording the measured values for the parameter associated with physical characteristic during the initial operating period; (g) calculating a first mean value and a first standard deviation value of the recorded values of the parameter associated with the physical characteristic during the initial operating period; (h) actuating a first alarm when the calculated parameter exceeds the first limit value for more than a predefined number of occurrences during one of the predefined successive intervals; (i) continuing to calculate the parameter during operation of the mechanical system, after actuation of the first alarm; (j) calculating a second limit value associated with the physical characteristic of the mechanical system; (k) comparing the calculated parameter to the calculated second limit value during the predefined successive intervals; (l) actuating a second alarm when the calculated parameter exceeds the second limit value; and (m) latching the first alarm after actuation, to prompt operator intervention.

Figure 1:
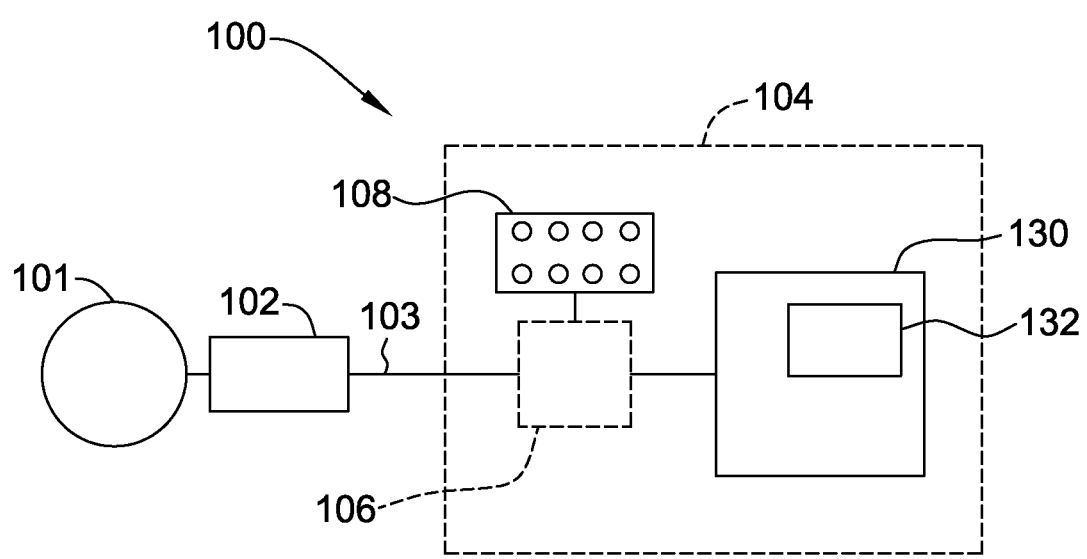
FIG. 1 is a schematic illustration of an exemplary measurement system that may be used to detect change using frequency analysis.

FIG. 1 is a schematic illustration of an exemplary measurement system 100 that includes a display 130 that may be used to monitor machine 101. Display 130 may be incorporated into an overall equipment control system, wherein the term "equipment control system" should be understood to include not only systems which actually regulate the operation of devices or machinery, but also systems such as monitoring or measurement systems, such as the measurement system 100.

For example, measurement system 100 may include one or more sensors 102, such as vibration transducers, that are connected to an apparatus 101 being tested, such as a shaft or mounting structure of a rotary machine, and/or as a wind turbine used for power generation, for example, that are likewise connected to a display system 104 that supports and provides a display 130. Display system 104 may include one or more processors 106 that receive, via connection 103 (which may be any suitable medium, whether hard-wired or wireless), raw signal(s) (not shown) transmitted from sensor(s) 102. In the exemplary embodiment, control panel 108 enables a user to selectively configure the image 132 being shown on, e.g., display 130, and select which numerical values processor(s) 106 derive from the raw signal(s) being transmitted from sensor(s) 102. Display system 104 may, for example, be a suitably programmed desktop or laptop computer, in which the internal processors of the desktop or laptop computer serve as processor(s) 106, its keyboard functions as control panel 108 and the screen of the desktop or laptop computer will show display 130. Sensors 102 (such as vibration transducers) will indicate vibration in the form of an analog waveform, and determination of the amount of vibration may be represented by calculation of a feature (parameter) of the waveform, such as peak-to-peak distance, and/or amplitude.

As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the exemplary embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the exemplary embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Figure 2:
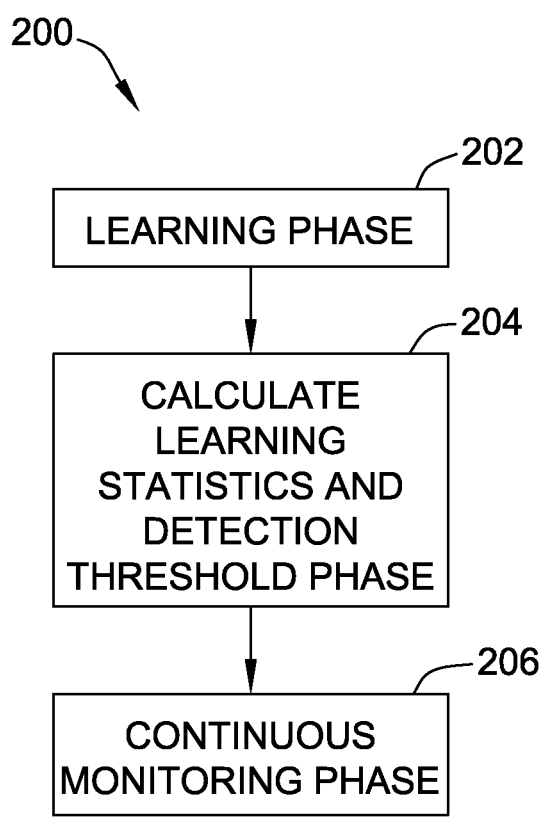
FIG. 2 is a flowchart generally illustrating the phases for implementing an exemplary embodiment of the methods for implementing robust change detection using frequency analysis.

Measurement system 100 is configured to implement a method for processing data acquired during monitoring of apparatus 101. FIG. 2 is a flowchart illustrating an exemplary method 200 that may be used to detect a change in a machine 101. Accordingly, in an exemplary embodiment, method 200 incorporates three phases: 1) learning phase 202, during which system 100 determines at least one baseline value corresponding to a characteristic of machine 101 during normal operation; 2) calculation 204 of learning statistics and detection threshold; and 3) continuous monitoring 206, which includes, as described herein, the calculation of subsequent or updated detection threshold(s). During learning phase 202, vibration data from apparatus 101 is collected over a period of time until a minimum sample size has been collected, for example, sixty (60) samples, but any sample quantity that provides a valid statistical set may be employed. As used herein, the term "valid statistical set" is defined as a representative group of data that is representative of the population of all data and include typical variations in operating conditions, such as changes in load, temperature, or any other parameter that would influence the vibrational characteristic being measured. Also used herein, the term "sample" is defined as data collected during a collection session over a previously-defined period of time, which may be extremely short (i.e., measurable in milliseconds), or relatively long by comparison (i.e., measurable in minutes, hours, days, etc.), depending upon the type of phenomenon being monitored. The sample collection sessions will generally occur at predefined periods of time, such as every thirty (30) minutes, or other period of time. Learning phase 202 may have a duration measured in hours, days (e.g., 10 days for machinery such as wind turbines for power generation), weeks, etc. Accordingly, a set of baseline values for the feature or parameter of the waveform (such as peak-to-peak distance or amplitude) is collected and recorded.

Following data acquisition during learning phase 202, system 100 calculates 204 the learning statistics and detection threshold (or limit value) for apparatus 101. The mean and standard deviation of the learning sample are calculated (step 308 shown in FIG. 3A). A detection threshold is created by calculating the mean+n standard deviations, where n can be any value, typically greater than or equal to three (≥3) (step 310 shown in FIG. 3A). Following calculation 204 of the learning statistics and detection threshold, system 100 begins continuous monitoring 206. During monitoring, system 100 collects a moving window (buffer) of data. The moving window serves a monitoring function to determine if a previously-defined number of events occurs within the defined window of time (as opposed to a moving average, which is a continuous recalculation of a numerical value, based on data acquired during a moving defined period of time). In an exemplary embodiment, system 100 uses a moving window (buffer) of data comprising thirty (30) samples, though window size may be selectively configured by an operator of system 100 to be greater or fewer than thirty (30) samples, depending upon the particulars of the apparatus 101 being monitored.

For each window, system 100 calculates the number of samples that exceed the detection threshold calculated during learning statistics and detection threshold calculation 204. If the number of samples exceeding the detection threshold ("alarm-level events") is greater than a predetermined value, for example twenty percent (>20%), or any suitably large proportion that is equivalent to an extremely low probability of occurrence, of the window size, then system 100 activates an alarm. For a thirty (30) sample window, the number exceeding the detection threshold required to activate the alarm is six (6) samples. For a normally distributed data set of 30 samples, typically during normal operation of an apparatus 101 such as a wind turbine, one expects only 0.04 samples to be above the three (3) standard deviation limit described with respect to calculation 204. It is believed to be improbable for a machine exhibiting truly normal operating conditions to exhibit a quantity of samples exceeding detection threshold (the threshold factor, or "threshfac1", as described below) that is greater than twenty percent (>20%) of the window sample quantity. Accordingly, such a high number would be deemed to clearly indicate the occurrence of an alarm-worthy event, and accordingly alarm triggering is justified.

It is possible that, during the course of acquiring samples, the "moving window" could transition from a period of normal operation for machine 101, to a period of abnormal operation or operation during unusual or difficult operating conditions. In such an event, there could result a brief period of operation during which the acquired data is distorted and therefore unreliable. Such an occurrence could result in a transitory period during which alarms may not be actuated during genuine alarm events. However, the systems and methods of the present invention are contemplated as being used with machinery and mechanical systems, in which developing problems result in a steadily increasing deviation from normal function. Therefore, even if a time delay results, for example if only three (3) outlier events out of thirty (30) samples are observed by system 100, as the function of machine 101 continues to deteriorate, the requisite six (6) outliers out of thirty (30) samples will be detected by system 100 sufficiently soon enough that a legitimate alarm will be triggered in time to enable the situation to be adequately addressed. System 100 is deliberately configured to accommodate an amount of delay in order to prevent false alarms from being triggered based on only one or two random outlier samples that exceed the detection threshold. Accordingly, system 100 is advantageously configured to address relatively gradually developing maintenance or fault situations, as opposed to providing quick response to abrupt catastrophic events.

The systems and methods described herein are configured so that when system 100 determines that a legitimate alarm event has occurred and an alarm is triggered, system 100 becomes "latched." That is, the alarm remains actuated (whether the alarm is a visual indicator, an annuciator, or simply a prominently displayed message in image 132 on display 130), and operator intervention is required in order to reset system 100 to a non-alarm actuated state. The use of a relatively high percentage of alarm-level events to require triggering accommodates not only individual random outlier events but also several outlier events, while still providing for reasonably consistent and reliable detection of actual alarm events and simultaneously reducing or prohibiting false alarms. Also, system 100 can cluster data acquired during different operational modes of the apparatus, such as when operation under relatively light load, versus operation under heavy load, when the characteristic behavior (vibration) of the apparatus of interest varies widely between the different operational modes (that is, there is a sharp definition, such as a marked increase in vibration amplitude, between operational modes).

Figure 3A:
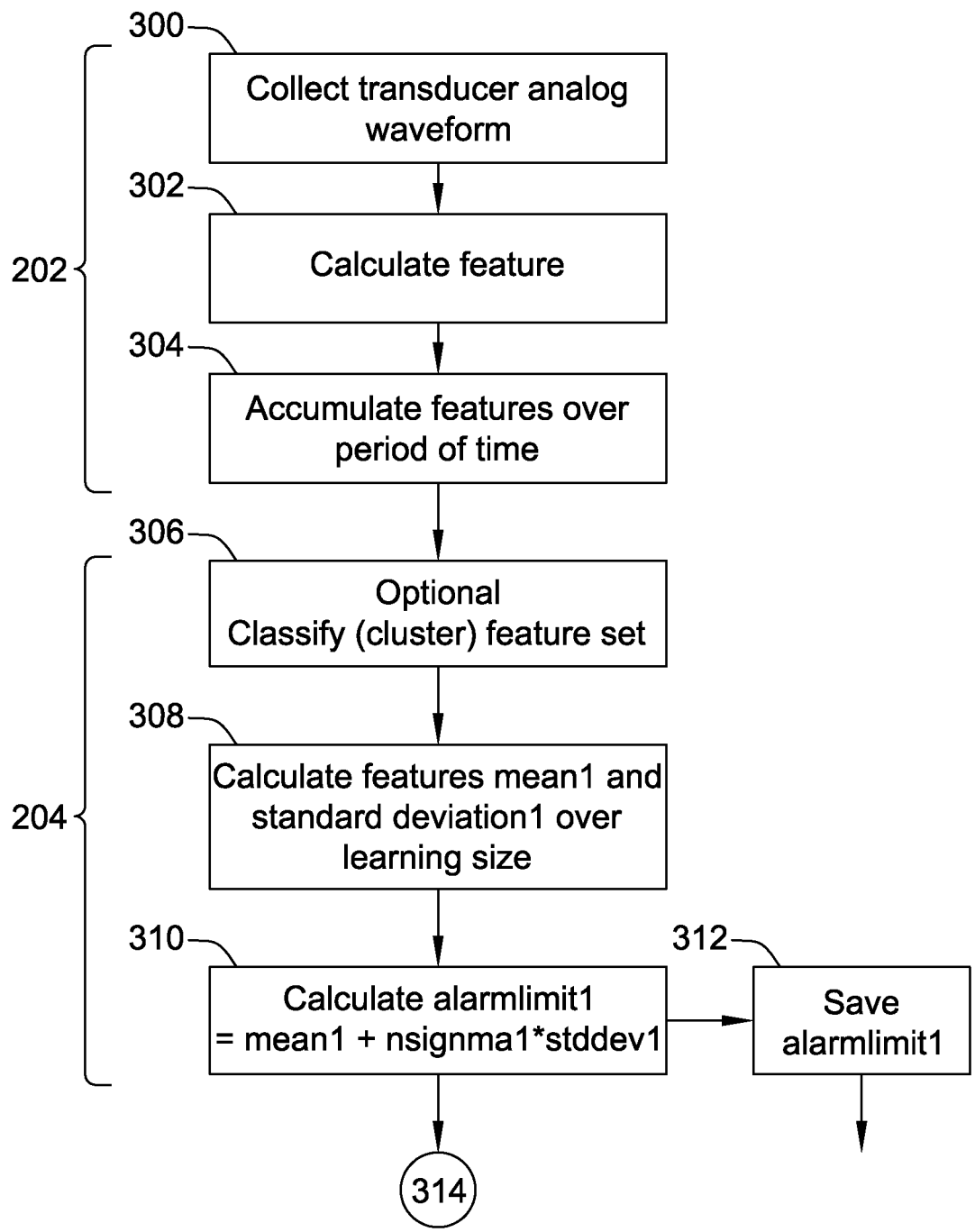
FIG. 3A is a detailed flowchart illustrating a beginning phase of an exemplary method for detecting change in machinery using frequency analysis.

FIG. 3A is a detailed flowchart illustrating a beginning phase of an exemplary method for detecting change in machinery using frequency analysis. Learning phase 200, as described above, begins with system 100 collecting baseline data 300, typically in the form of transducer analog or digitized waveforms from sensor(s) 102 (shown in FIG. 1). Following collection 300 of data, system 100 completes learning phase 202 by calculating 302 and accumulating (storing) 304 the particular feature of interest that will be employed for monitoring purposes. As previously described, one such feature is the peak-to-peak distance on the transducer waveform. Another feature might be the half- or full-wave amplitude (in absolute value) of the waveform.

After collection 300 of data during presumed ordinary operation of apparatus/machinery 101, system 100 proceeds with the calculate learning statistics and detection threshold phase 204 (see FIG. 2). System 100 calculates the parameter(s) required to calculate the detection threshold(s) necessary to initiate alarm actuation. In an exemplary embodiment, system 100 may be configured to cluster 306 the collected data according to whether certain groups of data were collected during specific operational modes of apparatus 101 of interest being monitored, such as data collected during peak load vs. data collected during off-peak load, as described above. Other parameters for clustering or classification of the collected data may include operating speed, power output, flowrate, etc. Whether clustering 306 is employed or not, system 100 then calculates 308 the mean ("Mean1") and standard deviation ("standard deviation 1" or "stddev1") of the feature of interest. For purposes of this discussion, "mean" and "standard deviation" are intended to connote the meanings, and are calculated using the algorithms, ordinarily associated with those terms as used in known statistical analysis techniques. As described above, mean1 and stddev1 are calculated over a predefined set size (e.g., 60 samples, though another set size may be selected as desired and appropriate for the particular application). System 100 then calculates 310 the alarm limit ("alarmlimit1"), as follows:

$$alarmlimit1 = mean1 + nsigma1 * stddev1$$

where nsigma1 ("n$\Sigma$1") is the number of standard deviations selected to be the amount, at or above which an alarm-level event is presumed (or defined) to have definitely occurred. In an exemplary embodiment, n$\Sigma$1 is operator-configurable, with a value of n$\Sigma$1=3 considered to be an appropriate default value, although a higher (or lower) value of n$\Sigma$1 may be selected. System 100 then saves alarmlimit1 and enters into continuous monitoring 206 during normal operation of apparatus 101.

Figure 3B:
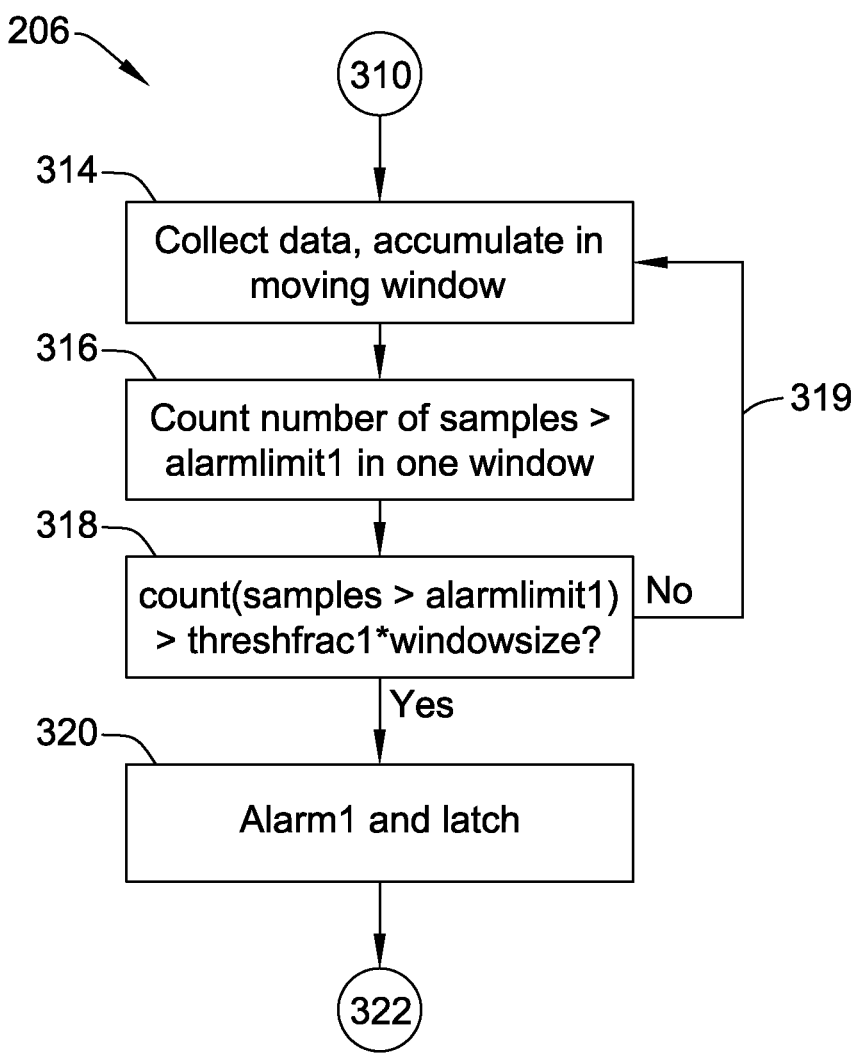
FIG. 3B is a detailed flowchart illustrating an intermediate phase of an exemplary method for detecting change in machinery using frequency analysis.

FIG. 3B is a detailed flowchart illustrating an intermediate phase of the exemplary method for detecting change in machinery using frequency analysis. During continuous normal operation 206 of apparatus/machinery 101, system 100 continues to acquire data 314 and calculate the feature of interest, using a moving window of a predefined number of samples, e.g., 30 samples, though a greater or lesser number of samples may be selectively employed. System 100 continuously counts 316 the number of samples within the moving window that exceed the value of alarmlimit1. If the counted number of samples exceeding alarmlimit1 is less than the product of a threshold factor ("threshfac1") and the window size, system 100 moves 319 the moving window, and repeats steps 314-318. As described above, a default value of 0.20 (20%) may be selected for thresfac1, though system 100 may be configured to enable threshfac1 to be given a greater or lesser value by an operator. If the counted number of samples exceeding alarmlimit1 is greater than the product of threshfac1 and the windowsize, system 100 actuates and latches 320 an alarm ("alarm1").

Figure 3C:
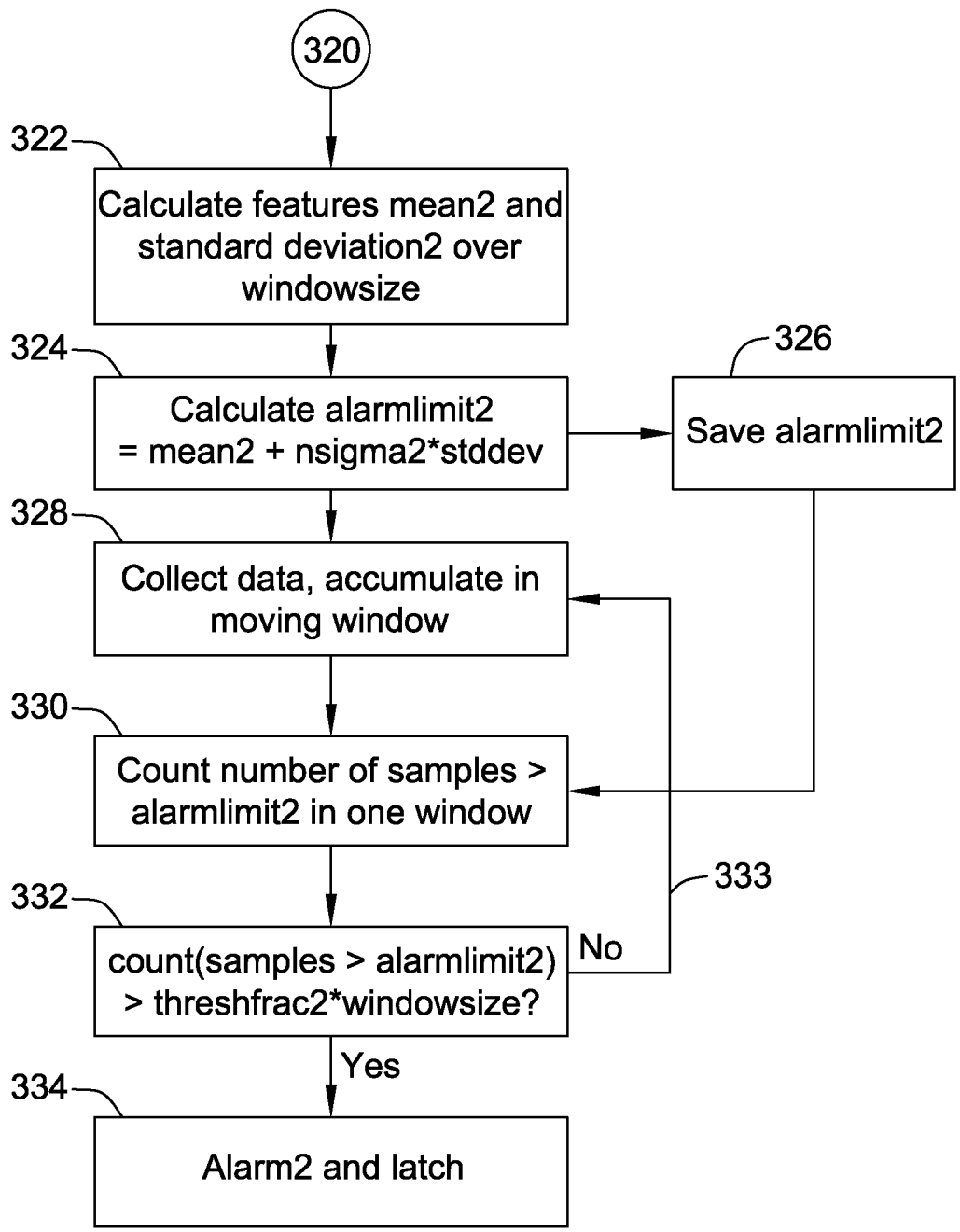
FIG. 3C is a detailed flowchart illustrating an ending phase of an exemplary method for detecting change in machinery using frequency analysis.

FIG. 3C is a detailed flowchart illustrating an optional ending phase of the exemplary method for detecting change in machinery using frequency analysis. In the alternative exemplary embodiment, system 100 may be configured to employ multiple alarm levels. For example, after triggering 320 of alarm1, apparatus/machinery 101 is presumed to be operating at a different level of performance. System 100 continues to collect data at the same rate and using the same time intervals as before, and, using the most recent set of data in the moving window, calculates 322 the new mean ("mean2") and standard deviation ("stddev2") for the same feature of interest as previously employed. System 100 then calculates 324 a new alarm limit ("alarmlimit2") as follows:

$$alarmlimit2 = mean2 + nsigma2 * stddev2$$

where nsigma2 ("n$\Sigma$2") is the number of standard deviations selected to be the amount, at or above which a higher-priority (i.e., more critical) alarm-level event is presumed (or defined) to have definitely occurred. In an exemplary embodiment, n$\Sigma$2 is operator-configurable, with a value of n$\Sigma$2=3 considered to be an appropriate default value, although a higher (or lower) value of n$\Sigma$2 may be selected, and need not be the same number as n$\Sigma$1. System 100 saves 326 the value for alarmlimit2, and continues to collect 328 data, accumulated in a moving window, as previously described. System 100 counts 330 the number of samples exceeding alarmlimit2 within each window. If the number of samples exceeding alarmlimit2 is less than the product of a new threshold factor ("threshfac2") and the window size, system 100 increments 333 the window and repeats steps 328-330 as described. If the number of samples exceeding alarmlimit2 is greater than the product of threshfac2 and the window size, system 100 actuates and preferably latches a second alarm ("alarm2"). Preferably, alarm2, whether audible, visual, textual or any combination thereof, is readily differentiable from alarm1, and is more prominently presented than alarm1, due to alarm2 representing a more urgent situation than alarm1. Likewise, inasmuch as alarm2 represents a more critical situation, to ensure that a positive reliable determination is made, threshfac2 has a higher value than threshfac1. For example, threshfac2 may be given a default value of 0.50 (again, this value may be higher or lower, as long as it is higher than threshfac1, and may be operator-configurable). System 100 may be configured to have additional alarm levels, if desired or appropriate to the particular application.

By requiring system 100 to detect the occurrence of twenty percent (20%) of the samples above the detection threshold prior to actuation of a first alarm (e.g., alarm1 as described above), system 100 attains a high degree of confidence that a legitimate alarm-level maintenance or failure mode event has occurred. By requiring a high degree of confidence, the incidence of false alarms is reduced. System 100 is configured to enable an operator to selectively vary the amount by which the detection threshold must be exceeded before an alarm is triggered. Increasing the required number of samples in excess of the detection threshold above the exemplary 20% value will delay alarming It is believed that reducing the required number of samples in excess of the detection threshold below the exemplary 20% value may render system 100 susceptible to false alarms.

System 100 may further be configured to add additional data to the baseline set of data acquired during learning phase 202. That is, even after operation under "normal" conditions, system 100 may be configured to enable an operator to set system 100 back into learning phase 202, to acquire additional data (to supplement the previously acquired data), following which new mean1 and stddev1 values are calculated.

In an exemplary embodiment, system 100 will be configured to enable an operator to completely replace a data set, as well as mean1 and stddev1 values acquired/calculated during steps 202 and 204, and substitute new data, and mean1 and stddev1 values, either in real-time or at time preprogrammed in advance, at the option of the operator.

In an exemplary embodiment, system 100 will also be configured to enable alarm1 and alarm2 to be reset (following operator intervention to address whatever eventuality occurred to prompt them). Also in an exemplary embodiment, system 100 will be operator-configurable to disable actuation of alarm1 and/or alarm2, which may be desirable under specialized conditions, though such disabling of alarm1/alarm2 would need to be exercised with caution to prevent damage to equipment or injury to personnel.

In an exemplary embodiment, system 100 will also be configured to have alarm events when operation results in downward changes in a feature of interest (such as loss of pressure when a fluid pressure is the physical feature being monitored), using a low alarm threshold (representing values below normal operational values). Such operations may be useful to indicate when data acquired during initial learning phase 202 may be corrupted (as when initial operating conditions were abnormal). In an exemplary embodiment, system 100 will also be configurable so that the period for learning phase 202 is based on a predefined time period, or a predefined number of sample points.

The operation of system 100 can yield additional useful data. For example, "meanratio" equals the ratio of the mean value of the feature of interest as continuously calculated in the moving window over the baseline mean value of the feature of interest. In an exemplary embodiment, "meanratio" is calculated and displayed continuously (or at predefined periodic intervals) during operation of apparatus/machinery 101, and during alarm events provides an indication as to the severity of the alarm-level event. That is, the greater the value of meanratio, the more severe the alarm-level event is.

Collection 300 of data during learning phase 202 also facilitates analysis of the data during initial operation of apparatus/machinery 101. By reviewing the distribution of values across the samples collected during collection 300, an operator may "manually" adjust the standard deviation value for stddev1, if, after statistical analysis of the originally-acquired data, the data appears to be distorted, and thus unreliable (e.g., resulting from other-than-optimal conditions, or structural issues, at the time of initial data collection).

Figure 4:
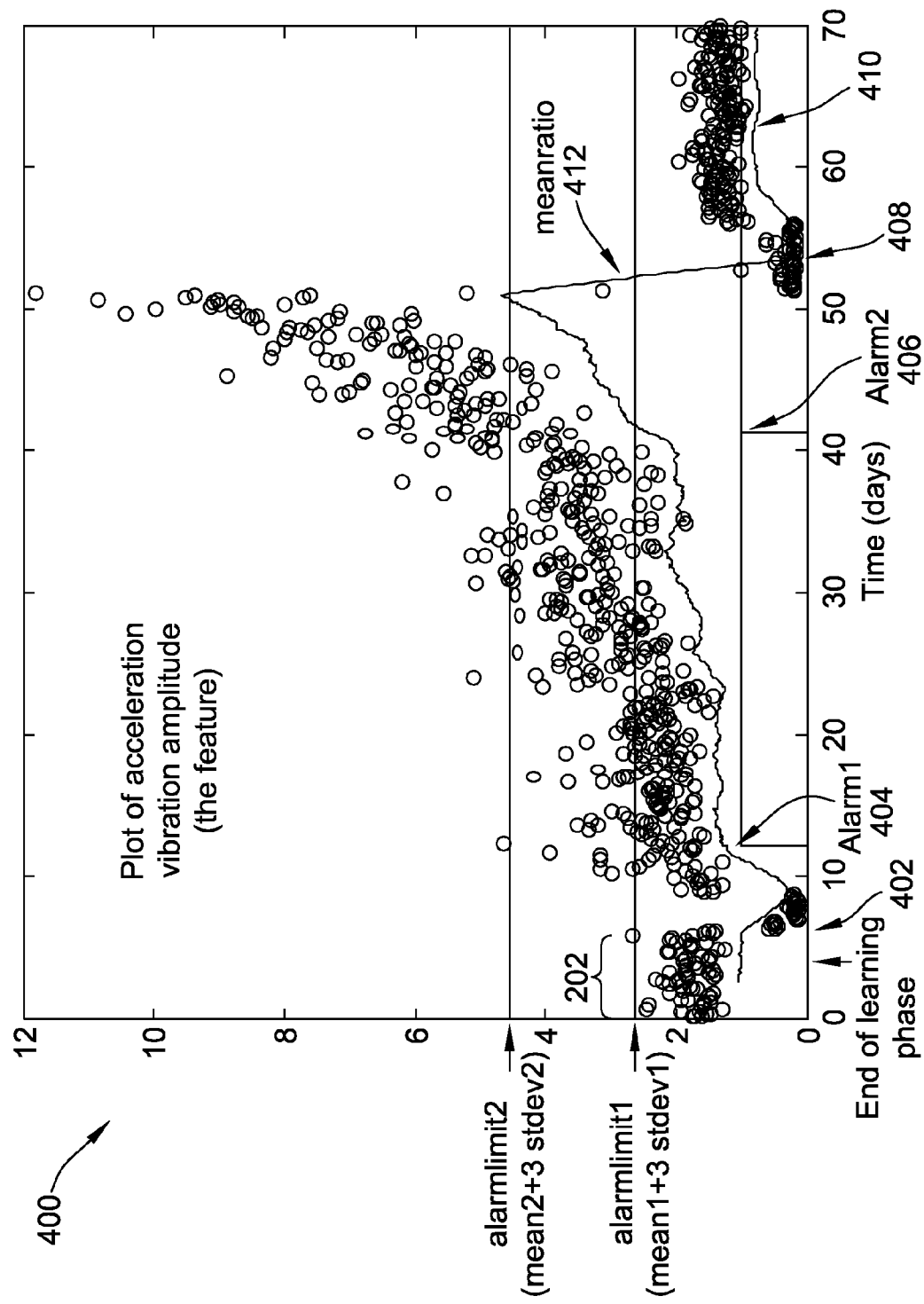
FIG. 4 is an exemplary plot of simulated observed behavior of an apparatus of interest over time that identifies a system learning phase and alarm-level events.

FIG. 4 is a representative plot 400 of a calculated feature, such as the vibration amplitude measured by an acceleration transducer versus time, for apparatus 101, which, in this example, may be an item of rotating machinery, such as a fan or wind-powered turbine. Learning phase 202 is indicated by the plot points early in the data record. At the end of learning phase 202, apparatus 101 is briefly shut down at 402, and then restarted. In the plotted example of FIG. 4, "normal" operation is quickly followed by operation beyond normal parameters, resulting in a first alarm-level event and activation of alarm1 at 404. As described above, after alarm1 occurs, data continues to be collected, and new mean2 and stddev2 values are calculated. As the operation of apparatus 101 continues to deviate increasingly from normal operation, alarm2 is triggered at 406. Subsequently, apparatus 101 is completely shut down (e.g., for repairs) at 408, following which is a period 410 of "normal" operation. Plot 400 also includes a trace representing the continuously-calculated meanratio 412, which, as can be seen, approaches 1 during periods of "normal" operation, exceeds 4 during abnormal operation, and far below 1, approaching 0, during shut down or low load periods.

The systems and methods described herein provide for the prompt detection of significant change in a single monitored and measured parameter of an operating machine, such as vibration amplitude. The systems and methods incorporate an embedded persistence test to protect against the creation of false alarms otherwise prompted by outlier events.

The systems and methods described herein address the conflicting challenges of preventing false alarms while maintaining sufficient sensitivity to ensure that no real legitimate alarm events are missed. The systems and methods described herein address these challenges by configuring a monitoring and measurement system associated with an apparatus of interest to learn normal operational behavior of the apparatus of interest, after which the monitoring and measurement system then applies robust change detection to running data acquired during operation of the apparatus of interest. The stringent exemplary requirement of detection of alarm-level events in quantity in excess of twenty percent (20%), or other selectable amount (dependent in part upon the requirements and specifications of the particular apparatus of interest) of the sample size, protects against normal condition outliers and ensures that significant change in operational conditions has taken place before triggering an alarm.

The systems and methods described herein present potential for providing increased accuracy in the triggering of alarms when monitoring machinery operation. In turn, the systems and methods described herein present the potential for earlier and more robust warning for operators of machinery enabling those operators to better manage their machinery. In addition, the systems and methods described herein address the potential need for service or technology personnel to have to configure large sets of alarms with limited information, thus resulting in a savings in manpower requirements. The systems and methods described herein further obviate the need for, and address possible difficulties encountered in, the use of conventional statistical analysis methods requiring large sets of data (for example, consisting of thousands of data samples) in order to provide reliable results. The systems and methods described herein also obviate the need for using such techniques as the calculation of moving averages, sometimes using multiple averages with different periods of time. Statistical and moving average approaches, due to the larger sample sizes often involved, can result in significant delay between the occurrence of a legitimate alarm-level event, and the calculation and identification of same by the monitoring system and/or operating personnel, which could, in turn, result in otherwise preventable downtime and/or equipment damage. Conventional statistical approaches are also more vulnerable to false alarms caused by outliers encountered during normal operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for use in detecting a change in a mechanical system during operation thereof, said system comprising:
   a processor; and
   a control system coupled to said processor and configured to:
      determine at least one baseline value for a parameter associated with a physical characteristic of the mechanical system during normal operation over a predetermined time interval;
      calculate a first limit value associated with the physical characteristic of the mechanical system based on the at least one baseline value for the parameter;
      monitor the mechanical system and periodically calculate the parameter associated with the physical characteristic at predefined successive time intervals; and
      compare the calculated parameter to the calculated first limit value during the predefined successive intervals to detect a change in the mechanical system during operation of the system, wherein said control system is further configured to calculate the parameter for a predefined number of samples taken during a monitoring window of predefined size, wherein the control system is further configured to:
   count the number of instances that the calculated parameter exceeds the first limit value during one of the predefined successive intervals; and
   compare the counted number of instances to the product of the predefined number of samples taken during a monitoring window and a threshold factor.

2. A system in accordance with claim 1 wherein said control system is further configured to:
   measure values for the parameter associated with the physical characteristic during an initial operating period; and
   record the measured values for the parameter associated with physical characteristic during the initial operating period.

3. A system in accordance with claim 2, wherein said control system is further configured to:
   calculate a first mean value and a first standard deviation value of the recorded values of the parameter associated with the physical characteristic during the initial operating period; and
   actuate a first alarm when the calculated parameter exceeds the first limit value for more than a predefined number of occurrences during one of the predefined successive intervals.

4. A system in accordance with claim 3, wherein the first limit value associated with the physical characteristic of the mechanical system is calculated according to the following relationship:

$$alarmlimit1 = mean1 + nsigma1 * stddev1$$

wherein alarmlimit1 is the first limit value, mean1 is the first mean value, stddev1 is the first standard deviation value, and nsigma1 is a constant.

5. A system in accordance with claim 4, wherein nsigma1=3.

6. A system in accordance with claim 1, wherein the threshold factor is 0.50.

7. A system in accordance with claim 3, wherein the control system is further configured to:
   continue to calculate the parameter during operation of the mechanical system, after actuation of the first alarm;
   calculate a second limit value associated with the physical characteristic of the mechanical system;
   compare the calculated parameter to the calculated second limit value during the predefined successive intervals; and
   actuate a second alarm when the calculated parameter exceeds the second limit value.

8. A system in accordance with claim 3, wherein said control system is further configured to latch the first alarm after actuation, to prompt operator intervention.

9. A method for detecting a change in a mechanical system during operation thereof, said method comprising:
   determining at least one baseline value for a parameter associated with a physical characteristic of the mechanical system during normal operation over a predetermined time interval;
   calculating a first limit value associated with the physical characteristic of the mechanical system based on the at least one baseline value for the parameter;
   monitoring the mechanical system and periodically calculating the parameter associated with the physical characteristic at predefined successive time intervals; and
   comparing the calculated parameter to the calculated first limit value during the predefined successive intervals to detect a change in the mechanical system during operation of the system, said method further comprising calculating the parameter for a predefined number of samples taken during a monitoring window of predefined size, said method further comprising:
      counting the number of instances that the calculated parameter exceeds the first limit value during one of the predefined successive intervals; and
      comparing the counted number of instances to the product of the predefined number of samples taken during a monitoring window and a threshold factor.

10. A method in accordance with claim 9, said method further comprising:
   measuring values for the parameter associated with the physical characteristic during an initial operating period; and
   recording the measured values for the parameter associated with physical characteristic during the initial operating period.

11. A method in accordance with claim 10, said method further comprising:
   calculating a first mean value and a first standard deviation value of the recorded values of the parameter associated with the physical characteristic during the initial operating period; and
   actuating a first alarm when the calculated parameter exceeds the first limit value for more than a predefined number of occurrences during one of the predefined successive intervals.

12. A method in accordance with claim 11, wherein the first limit value associated with the physical characteristic of the mechanical system is calculated according to the following relationship:

$$alarmlimit1 = mean1 + nsigma1 * stddev1$$

wherein alarmlimit1 is the first limit value, mean1 is the first mean value, stddev1 is the first standard deviation value, and nsigma1 is a constant.

13. A method in accordance with claim 12, wherein nsigma1 = 3.

14. A method in accordance with claim 9, wherein the threshold factor is 0.50.

15. A method in accordance with claim 11, said method further comprising:
   continuing to calculate the parameter during operation of the mechanical system, after actuation of the first alarm;
   calculating a second limit value associated with the physical characteristic of the mechanical system;
   comparing the calculated parameter to the calculated second limit value during the predefined successive intervals; and
   actuating a second alarm when the calculated parameter exceeds the second limit value.

16. A method in accordance with claim 11, said method further comprising latching the first alarm after actuation, to prompt operator intervention.

17. A system comprising:
   a processor; and
   a control system coupled to the processor and configured to:
   determine at least one baseline value for a parameter associated with a vibration characteristic of a mechanical system during normal operation over a predetermined time interval;
   calculate a first limit value associated with the vibration characteristic of the mechanical system based on the at least one baseline value for the parameter;
   monitor the mechanical system and periodically calculate the parameter associated with the vibration characteristic at predefined successive time intervals;
   compare the calculated parameter to the calculated first limit value during the predefined successive intervals to detect a change in the mechanical system during operation of the system;
   calculate the parameter for a predefined number of samples taken during a monitoring window of predefined size;
   count the number of instances that the calculated parameter exceeds the first limit value during one of the predefined successive intervals; and
   compare the counted number of instances to the product of the predefined number of samples taken during a monitoring window and a threshold factor.

18. The system of claim 17, wherein the threshold factor is 0.50.

19. The system of claim 17, wherein the control system is further configured to:
   calculate a first mean value and a first standard deviation value of recorded values of the parameter associated with the vibration characteristic during an initial operating period; and
   actuate a first alarm when the calculated parameter exceeds the first limit value for more than a predefined number of occurrences during one of the predefined successive intervals.

* * * * *